(12) United States Patent
Uhrig et al.

(10) Patent No.: US 12,375,391 B2
(45) Date of Patent: Jul. 29, 2025

(54) COMMUNICATION METHODS IN A NETWORK-ON-CHIP

(71) Applicant: Airbus (S.A.S.), Blagnac (FR)

(72) Inventors: Sascha Uhrig, Aying (DE); Johannes Freitag, Unterhaching (DE)

(73) Assignee: Airbus (S.A.S.), Blagnac (FR)

( * ) Notice: Subject to any disclaimer, the term of this patent is extended or adjusted under 35 U.S.C. 154(b) by 559 days.

(21) Appl. No.: 17/702,118

(22) Filed: Mar. 23, 2022

(65) Prior Publication Data

US 2022/0311699 A1    Sep. 29, 2022

(30) Foreign Application Priority Data

Mar. 25, 2021  (DE) ...................... 10 2021 107 484.3

(51) Int. Cl.
*H04L 45/00*    (2022.01)
*H04L 49/109*   (2022.01)

(52) U.S. Cl.
CPC ............ *H04L 45/22* (2013.01); *H04L 49/109* (2013.01)

(58) Field of Classification Search
CPC ... H04L 45/22; H04L 49/109; H04L 47/2416; H04L 45/28; H04L 45/16; H04L 45/34; H04L 45/74; H04Q 11/06; G06F 15/7825
USPC ...................................................... 370/237
See application file for complete search history.

(56) References Cited

U.S. PATENT DOCUMENTS

2019/0089619 A1* 3/2019 Yeager .................... H04L 43/50
2020/0410092 A1  12/2020 Mishara et al.
2021/0367905 A1* 11/2021 Matosevic ............. H04L 45/16
2022/0046587 A1*  2/2022 Rico Alvarino .. H04W 72/1263
2023/0041130 A1*  2/2023 Capalija ............. G06F 15/7807

FOREIGN PATENT DOCUMENTS

JP    2021013048 A    2/2021
WO   2009140707 A1   11/2009

OTHER PUBLICATIONS

German Search Report for Application No. 102021107484 dated Oct. 29, 2021.

(Continued)

*Primary Examiner* — Kwang B Yao
*Assistant Examiner* — Syed M Bokhari
(74) *Attorney, Agent, or Firm* — KDW Firm PLLC (57) ABSTRACT

A method for multi-source communication for triple-modular redundancy (TMR), a method for branched communication, and a method for virtual buses are disclosed. A method includes a) transmitting by at least two different source nodes in each case at least two identical messages which contain at least flow control data, payload data and check data to at least one predetermined receive node where the messages reach the receive node together at a predetermined time, b) combining by the receive node the messages received by the receive node into a combined message containing flow control data, payload data and check data, or comparing by the receive node of messages received by the receive node, and c) further processing of the combined message by the receive node or further processing of at least one of the messages received by the receive node based on comparison from step b).

5 Claims, 4 Drawing Sheets (56) References Cited

OTHER PUBLICATIONS

Daneshtalab, M. et al. "A generic adaptive path-based routing method for MPSoCs," Journal of Systems Architecture, Jan. 1, 2011.
Pakdaman Farhad et al., "Integrated circuit-packet switching NoC with efficient circuit setup mechanism," The Journal of Supercomputing, Nov. 23, 2014.
Arun M.R. et al., "A Novel Energy Efficient Multicasting Approach for Mesh NoCS," Procedia Computer Science, Aug. 12, 2016.
European Search Report for Application No. 22164166 dated Jan. 11, 2023.

* cited by examiner

COMMUNICATION METHODS IN A NETWORK-ON-CHIP

CROSS-REFERENCE TO RELATED APPLICATION

This application claims priority to German patent application DE 10 2021 107 484.3 filed Mar. 25, 2021, the entire disclosure of which is incorporated by reference herein.

TECHNICAL FIELD

The disclosure herein relates to communication methods in a network-on-chip (NoC). The disclosure herein further relates to an NoC, a computer program and a data carrier signal which implement the communication methods.

BACKGROUND

NoCs are generally known and normally designate interconnected (sub-)components within a single microchip. NoCs of this type are typically based on hops, i.e. data are transmitted from one component to the next, wherein point-to-point (P2P) or point-to-multipoint (multicast) connections are provided.

If supported, multicasts are implemented by routing message routes through all destination nodes and offloading the data at these destinations while they are forwarded to the next destination. Depending on the NoC type, message routes can be defined statically or dynamically, and by the source node or individually by each router (i.e., the routing components close to a node).

SUMMARY

An object of the disclosure herein is to improve NoCs, particularly in terms of their functional scope.

The object is achieved by the subject-matter disclosed herein. Preferred developments of the subject-matter are disclosed herein.

The disclosure herein provides a method for multi-source communication in a statically routed and time-sensitive NoC which has a multiplicity of router nodes which are interconnected so that the router nodes are enabled to exchange messages with one another, wherein the method comprises:

a) transmitting by at least two different source nodes in each case of at least two identical messages which contain at least flow control data, payload data and check data to at least one predetermined receive node in such a way that the messages reach the receive node together at a predetermined time;

b) combining by the receive node of the messages received by the receive node into a combined message which contains flow control data, payload data and check data, or comparing by the receive node of the messages received by the receive node; and c) further processing of the combined message by the receive node or further processing of at least one of the messages received by the receive node on the basis of the result of the comparison from step b).

It is preferred that, in steps b) and c), the receive node comprises an intermediate node which is disposed according to the flow control data along a route to a destination node to which the messages are directed according to the flow control data.

It is preferred that the receive node is an intermediate node in steps b) and c).

It is preferred that, in step c), the further processing in the intermediate node comprises forwarding the combined message generated in step b) to a next route segment of the route to the destination node.

It is preferred that, in steps b) and c), the receive node comprises a destination node to which the messages are directed according to the flow control data.

It is preferred that the receive node is a destination node in steps b) and c).

It is preferred that the further processing in the destination node comprises validating the combined message generated in step c) on the basis of the check data in order to obtain a checked message.

It is preferred that the further processing in the destination node is performed wherein, if the comparison in step b) reveals that the messages match one another, the payload data are further processed by the destination node, preferably forwarded to a functional component connected to the destination node.

It is preferred that, in step c), the validation is deemed successful if a result of a check algorithm applied to the combined message matches the check data, otherwise the validation is deemed unsuccessful.

The method preferably comprises a step d) in which the receive node, preferably the destination node, further processes the checked message if the validation on the basis of the check data was successful in step c), or rejects the checked message if the validation was unsuccessful in step c).

It is preferred that, in step b), the received messages are combined into the combined message by a bit-by-bit operation, preferably a bit-by-bit OR operation or a bit-by-bit AND operation.

It is preferred that, in step a), at least two identical messages are transmitted in each case by at least three different source nodes, if necessary along different routes, wherein the messages transmitted by different source nodes in each case comprise identical pairs.

It is preferred that, in step b), the messages received by the receive node are in each case combined in pairs by the receive node in order to obtain at least three combined messages.

It is preferred that, in step a), (N-1) identical messages are transmitted by N different source nodes in each case, if necessary along different routes, wherein the messages transmitted by different source nodes are in each case identical in pairs, where N is the number of source nodes.

It is preferred that, in step b), the messages received by the receive nodes are combined in each case in pairs by the receive node in order to obtain N combined messages.

It is preferred that, in step c), the combined messages are validated wherein the receive node compares the combined messages in each case in pairs with one another, wherein the validation is deemed to be successful if the comparison reveals that a majority of the combined messages are identical, otherwise the validation is deemed to be unsuccessful.

It is preferred that, in step c), the further processing, preferably the validation, is implemented as a hardware functionality in the receive node.

It is preferred that, in step c), the validation is established as successful if only a first received combined message has been successfully validated.

It is preferred that the router node, the receive node, the source node, the destination node and/or the intermediate node comprise a functional component which is designed to process the message, preferably the payload data and the check data.

The disclosure herein provides a method for branched communication in a statically routed and time-intensive NoC which has a plurality of router nodes which are interconnected so that the router nodes are enabled to exchange messages with one another, wherein the method comprises:

a) transmitting by a source node to a router node of a message which contains flow control data and payload data, wherein the flow control data contain at least one flit with at least one hop which define a main route to a main destination node and at least one branch route to a branch destination node;

b) receiving of the message by the router node;

c) modifying by the router node of the flow control data received in step b) in order to obtain modified flow control data, whereby, in order to obtain modified flow control data for the main route, the current hop is removed from the current flit and, if the current hop contains a branch marker, all hops assigned to the branch marker are removed from the received flow control data, and whereby, in order to obtain modified flow control data for the branch route, all hops assigned to the branch marker are recorded in the flow control data for the branch route; and d) forwarding of the message which contains the flow control data modified in step c), according to the flow control data received in step b), wherein the message is forwarded along the main route with the flow control data for the main route obtained in step c), and wherein the message is forwarded along the branch route with flow control data for the branch route.

It is preferred that, in step d), the forwarding of the message along the branch route is performed following a branching off from the main route, the current hop of the branch route is removed and the message is forwarded with the flow control data modified in this way to the next node along the branch route.

The disclosure herein provides a method for operating a virtual bus system in a statically routed and time-intensive NoC which has a plurality of router nodes which are interconnected so that the router nodes are enabled to exchange messages with one another, wherein the method comprises:

a) in the NoC, defining individual timeslots for each source node in such a way that the timeslots are time-shifted in relation to one another by a number of clock cycles which corresponds to the number of clock cycles required for transmitting the message from a first to a second source node, wherein each source node is enabled only in its corresponding time slot to transmit messages in order to create a virtual bus;

b) transmitting of a message by one of the source nodes to the destination node only if no message from a different source node passes through this source node in the timeslot for this source node.

It is preferred that each source node has a flag which indicates that the respective source is enabled to transmit a message.

It is preferred that, following the transmission of the message by the source node, the flag of the source node is deleted.

It is preferred that the destination node transmits a magic message to the source nodes if the destination node has received no message, preferably for a predetermined time, wherein the magic message causes each source node to restore its deleted flag.

It is preferred that, in step a), the timeslots are defined in such a way that a source node is assigned to a plurality of virtual buses, wherein the virtual buses are operated in an interleave mode.

The disclosure herein provides an NoC which has a plurality of router nodes which are interconnected so that the router nodes are enabled to exchange messages with one another, wherein the NoC is configured to operate according to a preferred method.

The disclosure herein provides a computer program comprising commands which, when executed by the preferred NoC, cause the NoC to carry out one of the preferred methods.

The disclosure herein provides a data carrier signal which transmits the preferred computer program.

The disclosure herein provides a flow control data structure for flow control data for use in an NoC, wherein the flow control data have a flit with a hop, wherein the hop has a main route indicator and a branch marker in each case with assigned hops, wherein the main route indicator causes a router node to forward a message to the next hop along a main route, and wherein the branch marker causes a router node to forward the message to the next hop along a branch route branched off from the main route.

One idea is to improve the functional scope of an NoC by a multisource communication.

The multisource communication described herein enables the transmission of the same message from at least two sources to at least one destination. The data transmission comprises combining or mixing the (two) messages and a validity check or consistency check at the destination node. A strictly timed network scheduling enables the sources to transmit the messages at a time and with a route such that the plurality of messages arrive at a predetermined time at a predetermined router.

The router combines these messages into a single message which is forwarded to a common downstream route segment (i.e., the same output of the router). The combination of the messages can be performed, for example, by a bit-by-bit OR operation (an AND operation is similarly possible) and contains the message headers, the payload data and the appended checksum. The correctness of the combined message is then checked by the receivers through evaluation of the checksum.

One purpose of the multisource technique is to reduce the footprint of a redundant message generation and checking, as used, for example, by safety-critical systems. Triple-modular redundancy (TMR) can be implemented by three transmitters which in each case transmit two messages which in turn are combined into three messages. If the checksum check is implemented as an automatic hardware functionality, the receive node needs to use only the first correctly received message, since this already indicates that the two corresponding transmitters had generated the same message.

Conversely, if three independent messages are sent to the receiver node (i.e. without multi-source functionality), the receiver node can explicitly compare the three messages in order to identify which of them are identical in order to perform a standard voting.

Optionally, it is also possible to integrate TMR voters directly into all or selected router nodes. The TMR voting can be performed according to the well-known 2-out-of-3 method in order to combine the three messages into a single message. The receiver(s) thus receive(s) one message only.

A further idea is to improve the functionality in terms of branched communication.

An NoC can use a routing in which the actual route of a message is stored in the message header. In this case, the header contains information relating to all hops, i.e., which route (N, E, S, W, local port) is taken to the next router. This information is typically provided in a queue from which the first element is removed during a hop. The next element is then accordingly the information relevant to the next hop. The last element in this queue contains a marker which identifies the last element as such.

If supported, multicasts are typically implemented wherein a message route passes sequentially through all destinations and the message is delivered to the local port of a plurality of routers.

A method is disclosed which additionally enables lateral branching from the main message route. This approach can be implemented by hops which contain a branch marker together with information indicating how many hops are relevant to the lateral branch. The relevant hop data are forwarded into the branch (and are removed from the main queue), whereas those hops which follow the branch hops continue to describe the main route.

One implementation can be based on a routing queue which stores a plurality of network flits (small data areas which are transmitted by the NoC in a time step). A flit of this type can contain f hops and N flits which describe the complete route, including branches. If a hop b marks a branch, the remaining hops in the flit describe the branch and the flit is forwarded to this branch only. The end of the (branch) route is indicated in the special flit, i.e., the length of the branch is limited by f and further sub-branches are not possible in this implementation.

The further routing of the main route is continued with the following flit which is transmitted in both directions, branch route and main route (as is the remainder of the message). Further branches from the main route can be implemented in the same manner. As shown in the following table, a main segment can have hops 1 to 5, a branch with three hops 6a to 8a, a following main segment with one hop 6m, a further branch with hops 7b and 8b, and the continuation of the main route with hops 7m to 11m.

| Head Flit | | | | | |
|---|---|---|---|---|---|
| Hop 1 | Hop 2 | Hop 3 | Hop 4 | Hop 5 | nextflit |
| Branch 1 | Hop 6a | Hop 7a | Hop 8a | end | |
| Hop 6m | Branch 2 | Hop 7b | Hop 8b | end | |
| Hop 7m | Hop 8m | Hop 9m | Hop 10m | Hop 11m | end |
| Data flits | | | | | |
| Lorem ipsum dolor sit amet . . . consectetur adipiscing elit, sed do eiusmod tempor . . . | | | | | |

Another idea is to configure a virtual bus.

Statically routed/scheduled networks are characterized in that messages cannot be transmitted at the earliest possible time, but must wait for the corresponding time slot. This can reduce the throughput of applications which require best performance (unlike time-critical applications for which correctly timed execution is the first priority). Virtual buses can be used in order to enable a best-effort communication/application of this type on an NoC with statically scheduled routing.

These virtual buses can provide periodically scheduled communication slots from a plurality of sources to one or more destinations. The shorter the scheduling period, the higher the throughput and the greater the influence on other traffic (e.g., critical traffic). A suitable scheduling period can be determined according to the number of source nodes and their traffic requirements. An analysis of the nodes (i.e. the applications executed there) can be helpful in identifying the throughput/scheduling requirements. The virtual bus can connect a plurality of sources, for example, to an external memory.

A virtual bus can be defined by individual transmit operations of the sources which are shifted by a number of clock cycles which a message requires from the first node to the second node, from the second node to the third node, etc. If a node wishes to transmit a message to the virtual bus, the node checks the router according to an incoming message (from the corresponding input port) or the corresponding output port. This means that a source checks whether a message passes, for example from north to south, at the determined transmit time. If no message is present, the respective source can transmit its message. Since the time slot for the preceding source has already elapsed, the source can no longer transmit a message during the time slot so that a collision can be avoided.

If this scheme is used, a priority-based arbitration of the virtual bus is implemented: the source node furthest removed from the destination node has the highest priority, the source node nearest to the destination node has the lowest priority.

With additional functionality in the source and destination router nodes, it is also possible to implement a round-robin arbitration: All sources hold a flag which allows them to transmit a message if the virtual bus is available to them (as explained above). If a source has transmitted its message (if it wishes to transmit a message), the flag is deleted, i.e., the source can no longer transmit a message. The destination node observes the virtual bus and, in the event that no message has been received, the destination node transmits a "magic" message in a separate routing slot to all sources. This message allows the sources to restore the flags so that messages can again be transmitted. In most cases, the separate slot for the communication from the original destination to the original sources is in any case available in order to transmit a response to the requester.

A third arbitration scheme, "Time Division Multiple Access" (TDMA), can be implemented without virtual buses by providing separate slots for each source to the destination.

Combinations of the access scheme or combinations of the same policy with different parameters are possible by scheduling a multiplicity of virtual buses with an interleave. A scenario can be implemented, for example, with the sources A, B, and C which are intended to access a memory, in which A and B require a higher throughput than C, whereby two interleaved virtual buses are used. The first bus deals with A, B, and C, and the second bus with A and B only. On average therefore, A and B receive around twice as much bandwidth as C.

If a minimal bandwidth is intended to be provided, for example for A and B, the round-robin policy can be applied to the A-B bus, whereas the priority-based policy is applied to the A-B-C bus. A and B can thus receive a minimum proportion in each case of 25%, while the remaining 50% is available to all three sources on a priority basis. Further fine-tuning can be achieved by other types of virtual buses.

BRIEF DESCRIPTION OF THE DRAWINGS

Example embodiments are explained in detail below with reference to the attached schematic drawings. In the drawings.

DETAILED DESCRIPTION

Figure 1:
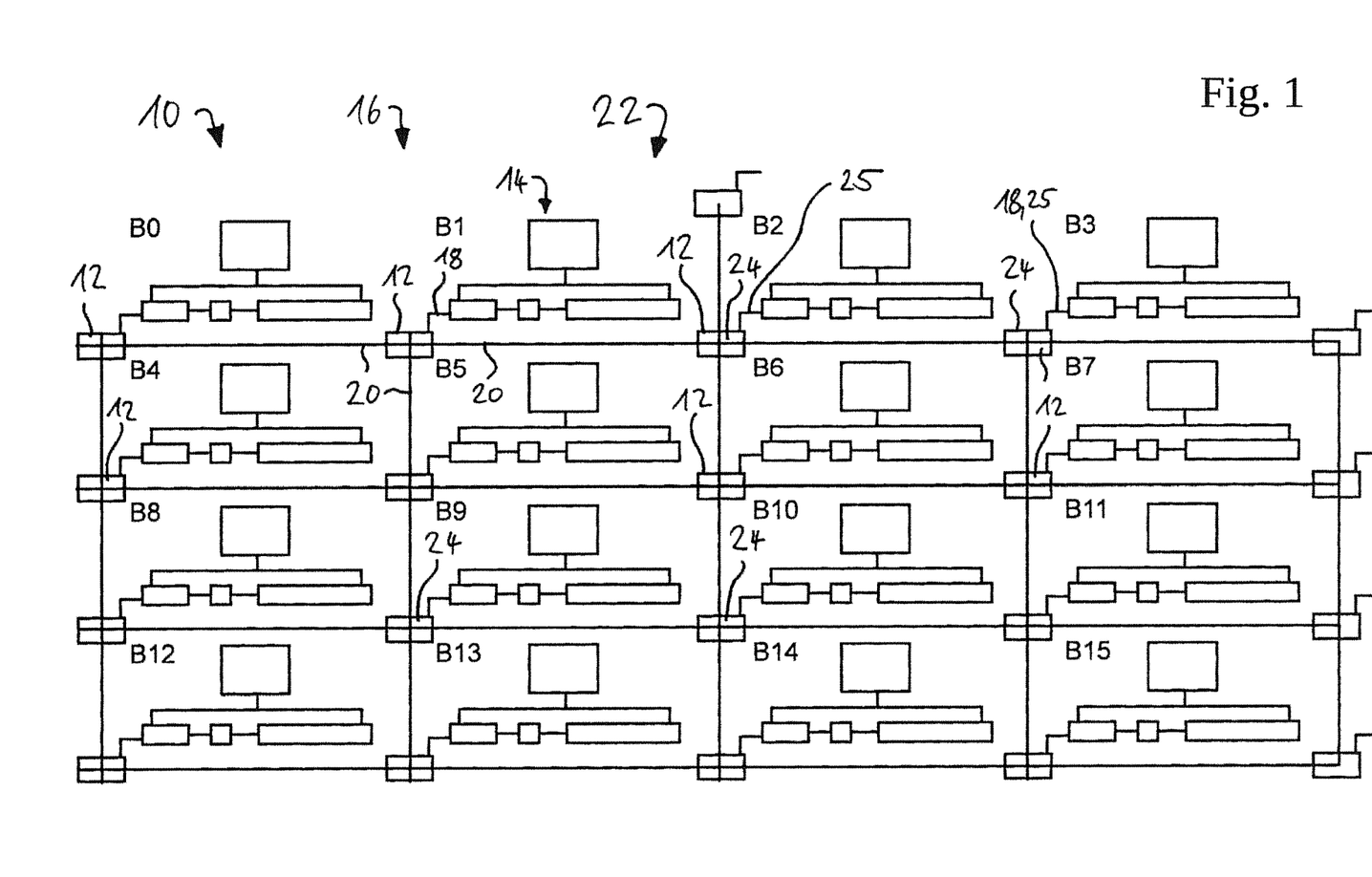
FIG. 1 shows an example of a microchip with an NoC.

Reference is made below to FIG. 1 which shows schematically a microchip 10. The microchip 10 has a plurality of functional units B0, . . . , B15. Each functional unit B0, . . . , B15 comprises a router component 12 and a functional component 14. As indicated in FIG. 1, a plurality of functional components 14, here, for example, sixteen functional components 14, can be combined into a functional block 16. The microchip 10 can have a plurality of these functional blocks 16.

The router components 12 can receive and transmit messages. The router components 12 are interconnected. The router components 12 are further configured to forward messages which are intended for the functional component 14 connected to the router component 14 to the functional component 14 for further processing.

The router components 12 have at least two connections, a component connection 18 and one or more routing connections 20. The component connection 18 is connected to the functional component 14. Each routing connection 20 is connected to a routing connection 20 of a different routing component 12.

The microchip 10 is further designed in such a way that it contains an NoC 22 by which the functional units B0, . . . , B15 can communicate with one another by their router components 12. The NoC 22 is configured as a statically routed time-sensitive network, also referred to herein as TSN for short.

Each router component 12 forms a router node 24 of the NoC 22. Each component connection 18 forms a local port 25. Each routing connection 20 can also be designated with a compass direction (N, E, S, W) which indicates the direction in which it is connected to a further router node 24.

Thus, for example, "N" designates a routing connection 20 which is connected upwards in FIG. 1 to a router node 24. Correspondingly, "E", "S" and "W" designate the directions to the right, downwards and to the left. It should be noted that the compass directions as used herein serve merely for illustrative purposes and are intended to simplify indications of the directions in which messages, data and the like are transmitted or forwarded.

Unless otherwise indicated, the microchip 10 and the NoC 22 are designed as explained above as independent from the operating modes/communication types described below.

Figure 2:
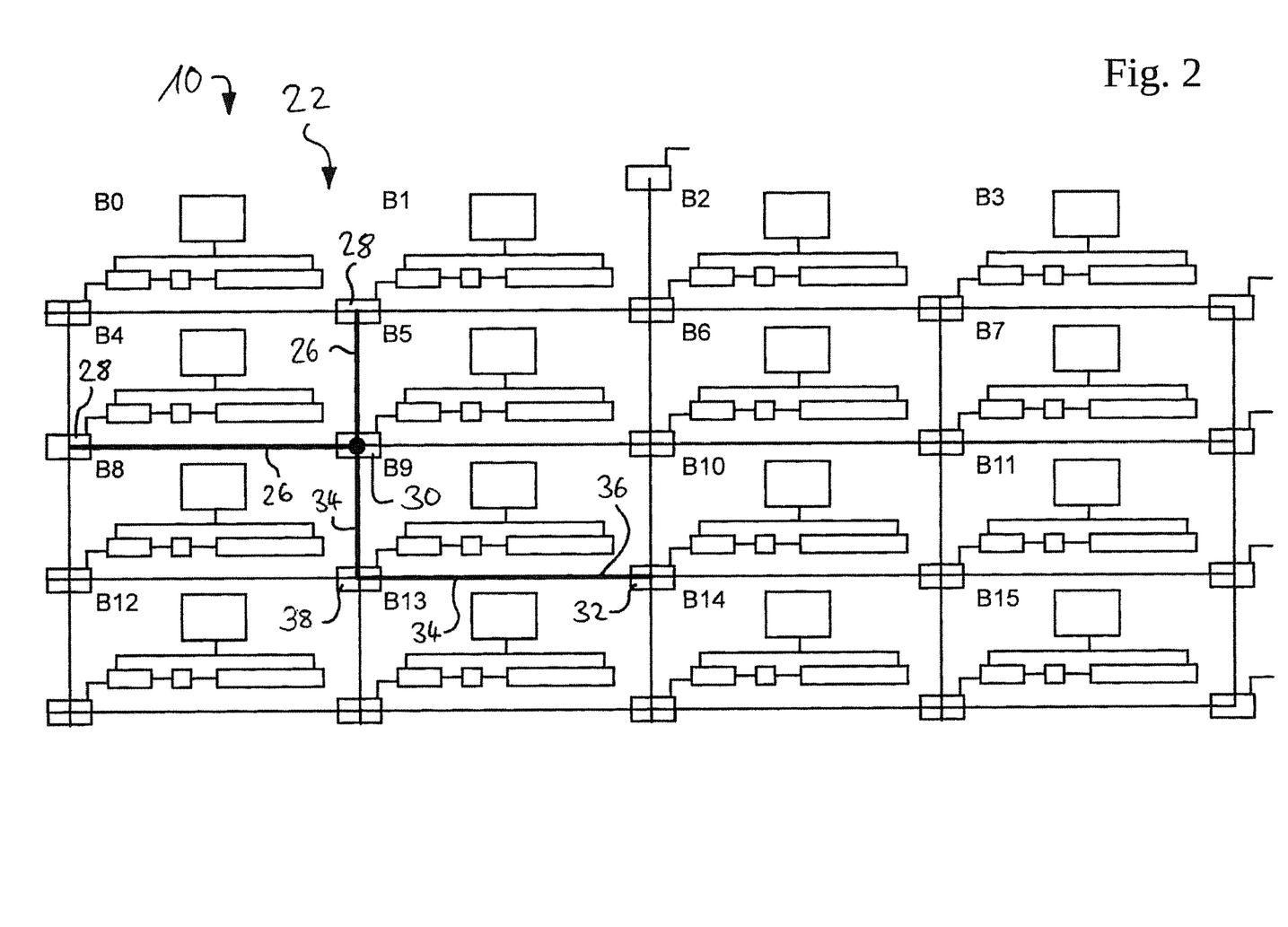
FIG. 2 shows an example of an NoC in operation with multi-source communication.

How a multi-source communication can be implemented in the NoC 22 is explained with reference to FIG. 2.

In the multi-source communication, identical messages 26 are transmitted from at least two source nodes 28 via an intermediate node 30 to a destination node 32. Each message 26 contains flow control data, payload data and a checksum.

The identical messages 26 are transmitted from each source node 28 using the characteristics of the NoC 22 in such a way that the messages 26 arrive at the same predetermined time at the predetermined intermediate node 30.

The intermediate node 30 combines the two messages 26 by a bit-by-bit OR operation or a bit-by-bit AND operation into a combined message 34. The intermediate node 30 transmits the combined message 34 via a next route segment 36, if necessary via further intermediate nodes 38, to the destination node 32. The further intermediate nodes 38 merely forward the combined message 34 and perform no operation on the message.

The destination node 32 receives the combined message 34 and the functional component 14 checks it on the basis of the checksum. If the validation on the basis of the checksum is successful, at least the payload data are further processed by the functional component 14. If the validation on the basis of the checksum fails, the message 34 is rejected. The failure can be communicated via a back channel to the source nodes 28.

In one variant, at least three source nodes 28 can in each case transmit at least two identical messages 26 which are combined in pairs in an intermediate node 38 into a total of at least three combined messages 34. The combined messages 34 are then transmitted, if necessary via different routes, to the destination node 32. The functional component 14 in turn checks the first message on the basis of the checksum. If the validation of one of the three combined messages 34 was successful, the validation was then successful as a whole, as this indicates that two independent source nodes 28 have transmitted the same messages 26.

In a further variant, three source nodes 28 can transmit identical messages 26 to the destination node 32. The messages 26 are combined with one another in the destination node 32, wherein the validation is deemed to be successful if two out of three messages match one another.

Figure 3:
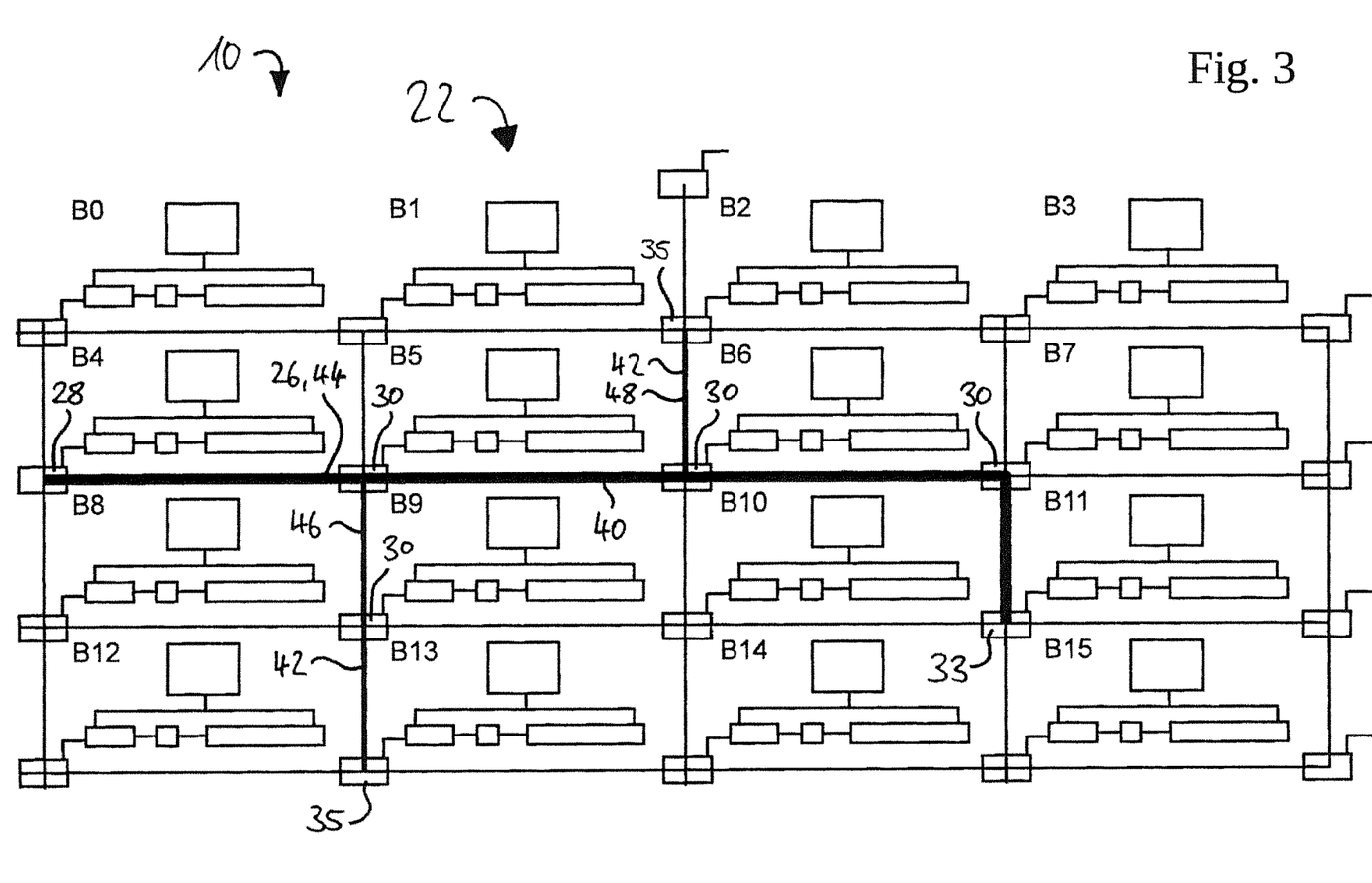
FIG. 3 shows an example of an NoC in operation with branch communication.

How a branch communication can be implemented in the NoC 22 is explained with reference to FIG. 3.

The source node 28 is intended to transmit a message 26 to a plurality of destination nodes 32. The source node 28 and one of the destination nodes 32 are connected by a main route 40. This destination node 32 is also referred to as the main destination node 33. The remaining destination nodes 32 are connected by branch routes 42 to the source node 28. These destination nodes 32 are also referred to as branch destination nodes 35.

The message 26 contains flow control data 44 in which the main route 40 and the branch routes 42 are defined. The flow control data 44 which indicate the node 30, 32 to which the message 26 is next transmitted are modified in each hop as follows:

The current hop is removed from the flow control data 44. If a branch marker is present which indicates that the one branch route 42 is intended to branch off from the main route 40, all hops of the branch route 42 are removed from the flow control data 44 for the main route 40. The message 26 is transmitted along the main route 40 with modified flow control data 44, and along the branch route 42 with flow control data 44 for the branch route 42.

The flow control data 44 comprise one flit with four hops as illustrated below. A branch from the main route exists in each case on hop 1 and hop 2.

| Head Flit | | | | |
|---|---|---|---|---|
| Hop 1 | Hop 2 | Hop 3 | Hop 4 | nextflit |
| Branch 1 | S | S | end | |
| E | Branch 2 | N | end | |
| E | E | S | end | |

The source node 28 (B4) transmits the message 26 first in direction E. The intermediate node 30 (B5) receives the message 26 and further distributes the message 26 on the basis of the flow control data 44. A branching into a first branch 46 and a forwarding in direction E are provided on Hop 1.

The intermediate node 30 (B5) forwards the message 26 with the following flow control data 44 in direction E along the main route 40 to the intermediate node 30 (B6):

| Head Flit | | | |
|---|---|---|---|
| Hop 2 | Hop 3 | Hop 4 | nextflit |
| Branch 2 | N | end | |
| E | S | end | |

The intermediate node 30 further forwards a copy of the message 26 and the following flow control data 44 in direction S along the first branch 46 to the intermediate node 30 (B9):

| Head Flit | | |
|---|---|---|
| Hop 3 | Hop 4 | nextflit |
| S | end | |

The intermediate node 30 (B9) finally forwards the message 26 in direction S along the first branch 46 to the destination node 32 (B13) which then outputs the message via its local port 25 to the functional component 14.

The intermediate node 30 (B6) proceeds accordingly and transmits the message 26 in direction E along the main route 40 to the intermediate node 30 (B7) with the following flow control data 44:

| Head Flit | | |
|---|---|---|
| Hop 3 | Hop 4 | nextflit |
| S | end | |

The intermediate node 30 (B6) further transmits the message 26 in direction N along the second branch 48 to the destination node 32 (B2) with the following flow control data 44:

| Head Flit | |
|---|---|
| Hop 4 | nextflit |
| end | |

The intermediate node 30 (B7) finally forwards the message 26 to the destination node 32 (B11) with the following flow control data 44:

| Head Flit | |
|---|---|
| Hop 4 | nextflit |
| end | |

The message 26 has thus been routed from the source node 28 (B4) to the three destination nodes 32 (B6, B11, B13) wherein the message 26 has been transmitted along the main route 40 from the source node 28 (B4) to the main destination node 33 (B11), while the message 26 has further been routed along the branches 46, 48 to the branch destination nodes 35 (B6, B13).

Unlike conventional multicast transmission, the message 26 is not routed successively through all destination nodes 32, but instead, if necessary branching off from the main route 40, is routed directly to the destination nodes 32 which in each case are the last node of the respective route.

Figure 4:
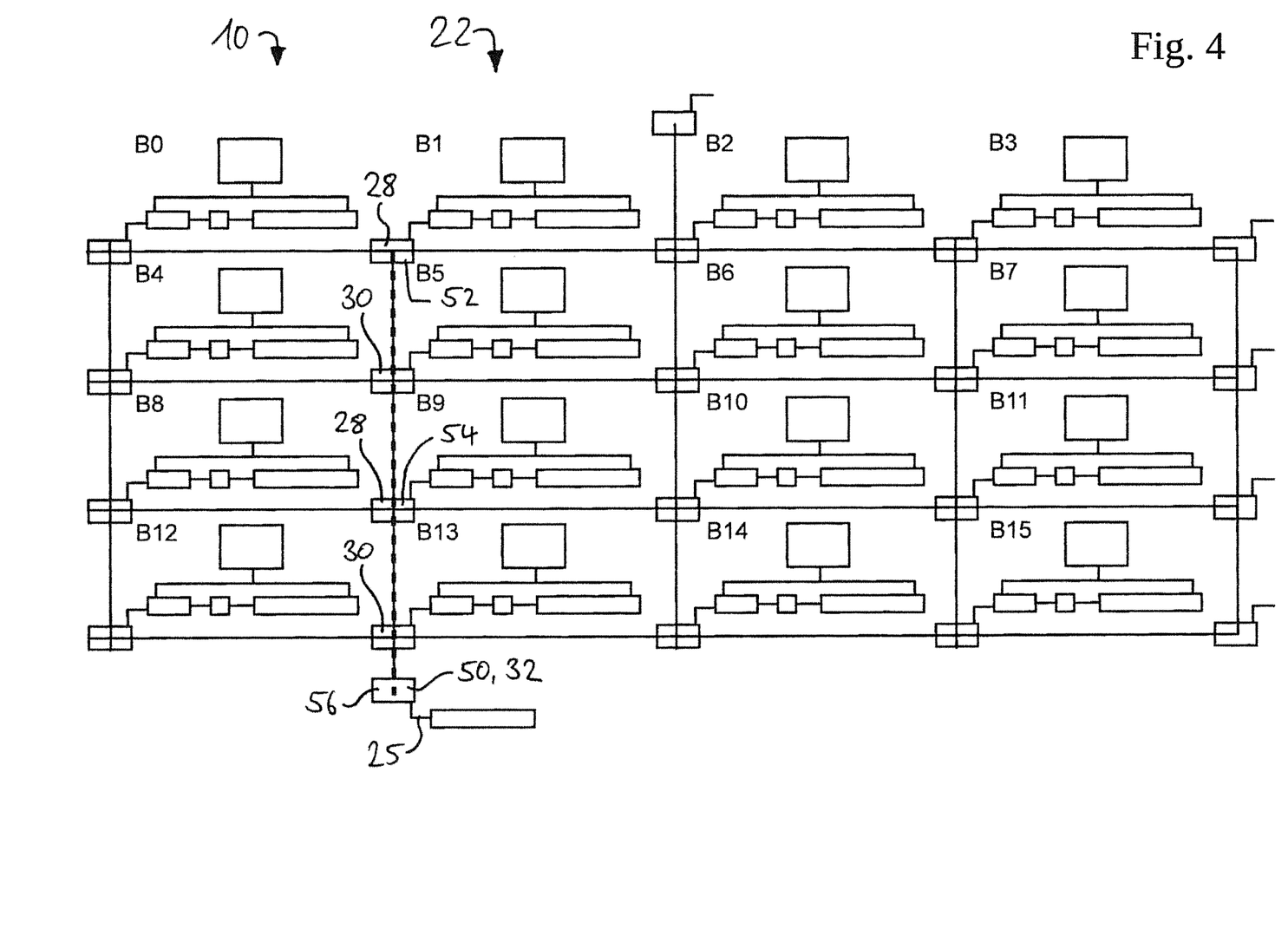
FIG. 4 shows an example of an NoC in operation with a virtual bus.

How a virtual bus can be implemented in the NoC 22 is explained with reference to FIG. 4. A storage node 50 is further incorporated into this NoC 22. The storage node 50 is therefore simultaneously the destination node 32.

The NoC 22 is configured as time-sensitive, so that a plurality of predetermined time slots are provided for individual transmit operations from source nodes 28. The timeslots are time-shifted in relation to one another by a number of clock cycles of the NoC 22 which corresponds to the number of clock cycles which a message 26 requires from a first node 52 (B1) to a second node 54 (B9), from a second node 54 (B9) to a third node 56 (B13), etc.

For the sake of simplicity, it is assumed below that the message 26 requires precisely one clock cycle from one node to the next node. There may, however, also be a plurality of clock cycles.

The mode of operation of the virtual bus is described below by way of example on the basis of two source nodes 28 (B1, B9) which transmit data to the storage node 50.

The source node 28 (B1) transmits a message in its timeslot in the direction of the storage node 50. The message is routed via an intermediate node 30 (B5) to the destination node 28 (B9). This source node 28 (B9) checks whether the message from the preceding source node 28 (B1) is currently incoming or outgoing in its timeslot. If not, the source node 28 (B9) can transmit its message in the direction of the storage node 50. Since the timeslot for the other source node 28 (B1) has already elapsed, the latter cannot transmit and a collision of the messages is avoided.

The messages are then forwarded via the intermediate node 30 (B13) to the destination node 32 (here: the storage node 50) and are output by the latter via its local port 25 to the actual storage device.

In one round-robin variant, the source nodes 28 are in each case provided with a flag which indicates that the respective source node 28 is permitted to transmit a message. If a source node 28 has transmitted a message in its timeslot, the flag is deleted. The respective source node 28 can then no longer transmit a message.

The destination node 32 transmits a magic message via a return route back to all source nodes 28, wherein the magic message causes the source nodes 28 to restore their flag.

In a Time Division Multiple Access variant (TDMA variant), separate timeslots are implemented for each source node 28 to the destination node 32. A virtual bus is not necessarily required for this purpose.

The variants described above can also be combined in order to regulate the available bandwidth for the source nodes 28.

The functional scope of NoCs (22) can be extended with the measures described herein. In particular, a method for multi-source communication for triple-modular redundancy (TMR), a method for branched communication and a method for virtual buses are proposed.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMBER LIST

10 Microchip
12 Router component
14 Functional component
16 Functional block
18 Component connection
20 Routing connection
22 NoC (Network-on-Chip)
24 Router node
25 Local port
26 Message
28 Source node
30 Intermediate node
32 Destination node
33 Main destination node
34 Combined message
35 Branch destination node
36 Route segment
38 Further intermediate node
40 Main route
42 Branch route
44 Flow control data
46 First branch
48 Second branch
50 Storage node
52 First node
54 Second node
56 Third node
B0, . . . , B15 Functional unit

The invention claimed is:

1. A method for branched communication in a statically routed and time-sensitive network-on-chip (NoC) which has a multiplicity of router nodes which are interconnected so that the router nodes are enabled to exchange messages with one another, the method comprising steps of:
   a) transmitting by a source node to a router node of a message which contains flow control data and payload data, wherein the flow control data contain at least one flit with at least one hop which define a main route to a main destination node and at least one branch route to a branch destination node;
   b) receiving of the message by the router node;
   c) modifying by the router node of the flow control data received in step b) to obtain modified flow control data, whereby, to obtain modified flow control data for the main route, current hop is removed from current flit and, if the current hop contains a branch marker, all hops assigned to the branch marker are removed from the received flow control data, and whereby, to obtain modified flow control data for the branch route, all hops assigned to the branch marker are recorded in the flow control data for the branch route; and
   d) forwarding of the message which contains the flow control data modified in step c), according to the flow control data received in step b), wherein the message is forwarded along the main route with the flow control data for the main route obtained in step c), and wherein the message is forwarded along the branch route with flow control data for the branch route.

2. The method according to claim 1, wherein, in step d), the forwarding of the message along the branch route is performed following a branching off from the main route, the current hop of the branch route is removed and the message is forwarded with the flow control data modified in this way to a next node along the branch route.

3. A method for operating a virtual bus system in a statically routed and time-sensitive network-on-chip (NoC) which has a multiplicity of router nodes which are interconnected so that the router nodes are enabled to exchange messages with one another, the method comprising:
   a) in the NoC, defining individual timeslots for each source node such that the timeslots are time-shifted in relation to one another by a number of clock cycles which corresponds to a number of clock cycles required for transmitting the message from a first to a second source node, wherein each source node is enabled only in its corresponding time slot to transmit messages to create a virtual bus; and
   b) transmitting of a message by one of the source nodes to the destination node only if no message from a different source node passes through this source node in a timeslot for this source node.

4. The method according to claim 3, wherein each source node has a flag which indicates that a respective source node is enabled to transmit a message, wherein, following the transmitting of the message by the source node, the flag of the source node is deleted, wherein the destination node transmits a magic message to the source nodes if the destination node has received no message for a predetermined time, wherein the magic message causes each source node to restore its deleted flag.

5. The method according to claim 3, wherein, in step a), the timeslots are defined such that a source node is assigned to a plurality of virtual buses, wherein the virtual buses are operated in an interleave mode.

* * * * *